US007529891B2

(12) United States Patent
Thekkath et al.

(10) Patent No.: US 7,529,891 B2
(45) Date of Patent: May 5, 2009

(54) BALANCED PREFETCHING EXPLOITING STRUCTURED DATA

(75) Inventors: Chandramohan A. Thekkath, Palo Alto, CA (US); John P. MacCormick, Mountain View, CA (US); Lidong Zhou, Sunnyvale, CA (US); Nicholas Charles Murphy, San Mateo, CA (US)

(73) Assignee: Microsoft Corporation, Armonk, NY (US)

( * ) Notice: Subject to any disclaimer, the term of this patent is extended or adjusted under 35 U.S.C. 154(b) by 291 days.

(21) Appl. No.: 11/230,028

(22) Filed: Sep. 19, 2005

(65) Prior Publication Data

US 2007/0067576 A1 Mar. 22, 2007

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. .................. 711/137; 711/129; 711/204
(58) Field of Classification Search ................ 711/137, 711/213, 129, 204
See application file for complete search history.

(56) References Cited

U.S. PATENT DOCUMENTS

| 4,807,110 | A | * | 2/1989 | Pomerene et al. | 711/213 |
|---|---|---|---|---|---|
| 5,220,667 | A | | 6/1993 | Ichieda | 395/700 |
| 5,293,609 | A | * | 3/1994 | Shih et al. | 711/137 |
| 5,305,389 | A | * | 4/1994 | Palmer | 382/305 |
| 5,333,311 | A | | 7/1994 | Whipple, II | 395/600 |
| 5,394,531 | A | * | 2/1995 | Smith | 711/136 |
| 5,713,008 | A | | 1/1998 | Falkner | 395/500 |
| 5,950,007 | A | | 9/1999 | Nishiyama et al. | 395/707 |
| 6,073,232 | A | | 6/2000 | Kroeker et al. | 713/1 |
| 6,487,632 | B1 | * | 11/2002 | Nakatani | 711/112 |
| 6,879,266 | B1 | * | 4/2005 | Dye et al. | 341/51 |
| 7,107,400 | B2 | * | 9/2006 | Benhase et al. | 711/118 |
| 2005/0060496 | A1 | * | 3/2005 | Krissell et al. | 711/133 |
| 2005/0210198 | A1 | * | 9/2005 | Dimpsey et al. | 711/137 |

OTHER PUBLICATIONS

English, R.M. et al., "Loge: A Self-Organizing Disk Controller", *Proceedings of USENIX Winter technical Conference*, Jan. 20-24, 1992, 237-251.

Griffioen, J. et al., "Reducing File System Latency Using a Predictive Approach", *Department of Computer Science, University of Kentucky*, MS-CAC 89-99.

Hatfield, D.J. et al., "Program Restructuring for Virtual Memory", *Program Restructuring*, 1971, 3, 168-192.

(Continued)

*Primary Examiner*—Sanjiv Shah
*Assistant Examiner*—Yaima Campos
(74) *Attorney, Agent, or Firm*—Woodcock Washburn LLP (57) ABSTRACT

Balanced prefetching automatically balances the benefits of prefetching data that has not been accessed recently against the benefits of caching recently accessed data, and can be applied to most types of structured data without needing application-specific details or hints. Balanced prefetching is performed in applications in a computer system, such as storage-centric applications, including file systems and databases. Balanced prefetching exploits the structure of the data being prefetched, providing superior application throughput. For a fixed amount of memory, it is automatically and dynamically determined how much memory should be devoted to prefetching.

20 Claims, 4 Drawing Sheets

OTHER PUBLICATIONS

Kroeger, T.M. et al., "Predicting File System Actions from Prior Events", *Proceedings of the USENIX Annual Technical Conference,* 1996, 101-110.

Palmer, M. et al., "Fido: A Cache That Learns to Fetch", *Proceedings of the 17th International Conference on Very Large Data Base,* Sep. 1991, 255-264.

Patterson, R. Hugo, et al., "Informed Prefetching and Caching", *Proceedings of the 15th ACM Symp. On Operating System Principles,* 1995, 79-95.

Staelin, C. et al., "Smart Filesystems", *USENIX,* 1991, 45-51.

Tait, Carl D. et al., "Detection and Exploitation of File Working Sets", *IEEE,* 1991, 2-9.

Cao, P., et al., "A study of integrated prefetching and caching strategies," *Measurement and Modeling of Computer Systems (SIGMETRICS),* 1995, 188-197 (abstract, 1 page).

Hugo, P., et al., "Informed prefetching and caching," *ACM Symposium on Operating Systems Principles,* 1995, 79-95.

Megiddo, N., et al., "ARC: a self-tuning, low overhead replacement cache," *Proc. 2nd USENIX Conference on File and Storage Technologies,* 2003, 115-130.

Yeh, T., et al., "Increasing predictive accuracy through limited prefetching," *Proceedings of Communications Networks and Distributed Systems Modeling and Simulation (CNDS),* 2001, 7 pages.

* cited by examiner

BALANCED PREFETCHING EXPLOITING STRUCTURED DATA

BACKGROUND

Figure 1:
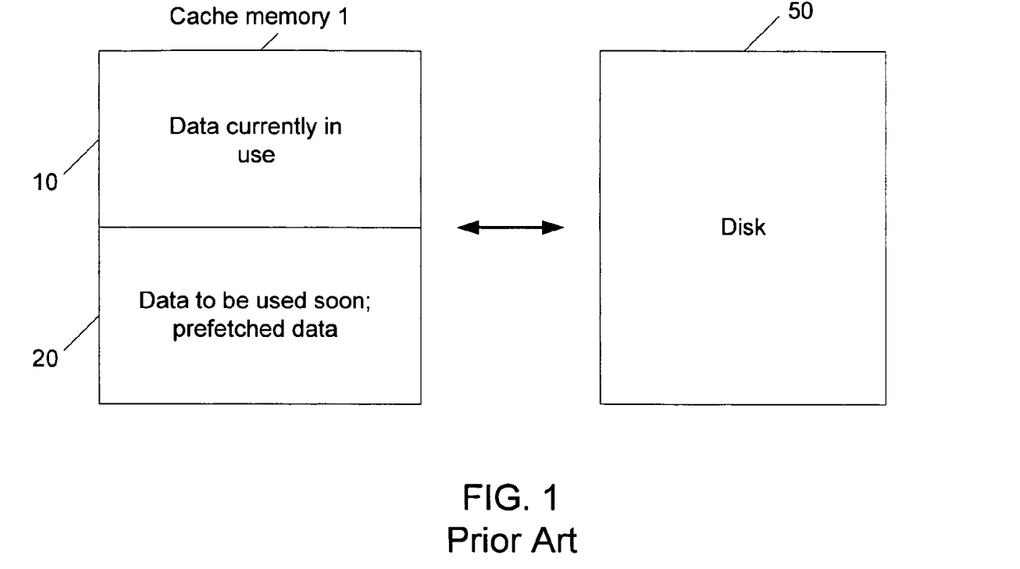
FIG. 1 is a diagram of a conventional memory system.

Conventional computer systems have a relatively slow storage system (e.g., data stored on hard disks) and a relatively fast memory system (e.g., a standard computer random access memory, or RAM). FIG. 1 is a diagram of a conventional memory system. A cache memory 1 is shown as a fast memory system and a disk 50 is shown as the slow storage system.

In running an application on a system that requires access to data, it is not known what data needs to be accessed. It is desirable that the data that will be accessed soon is stored in the memory system. As shown in FIG. 1, the cache memory 1 has an area 10 that stores data that is currently in use, and an area 20 that contains prefetched data or data that is to be used soon.

Some processing units run an application that requires access to the data in the slow storage system 50 (e.g., some CPUs run a file system or database). The data in the slow storage system 50 is partitioned into pages, which can be cached in the memory system 1 for faster access. In many cases, the application's throughput can be increased by guessing which pages will soon be accessed, and proactively prefetching those pages into the prefetched area 20 of the fast memory system 1.

Storage-centric applications must somehow trade off the benefits of prefetching data that has not recently been accessed but might soon be needed, against the benefits of caching data that has been recently accessed and might soon be needed again. Prior art uses hints provided by applications, but such prior art is application-specific, and does not use the structural information in the data with a dynamically adjustable allocation scheme.

SUMMARY

Balanced prefetching automatically balances the benefits of prefetching data that has not been accessed recently against the benefits of caching recently accessed data, and can be applied to most types of structured data without needing application-specific details or hints. Balanced prefetching is performed in applications in a computer system, such as storage-centric applications, including file systems and databases. Balanced prefetching exploits the structure of the data being prefetched, providing superior application throughput. For a fixed amount of memory, it is automatically and dynamically determined how much memory should be devoted to prefetching.

DETAILED DESCRIPTION

The invention will be more completely understood through the following detailed description, which should be read in conjunction with the attached drawings. In this description, like numbers refer to similar elements within various embodiments of the invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment. The skilled artisan will readily appreciate that the methods and systems described herein are merely exemplary and that variations can be made without departing from the spirit and scope of the invention.

An application's throughput can be increased by guessing, estimating, or otherwise determining which pages will soon be accessed, and proactively prefetching those pages into the faster memory system. Balanced prefetching exploits the structure of the data in the storage system in order to decide which pages to prefetch. This results in superior performance compared to prefetching strategies which do not exploit the data's structure.

Figure 2:
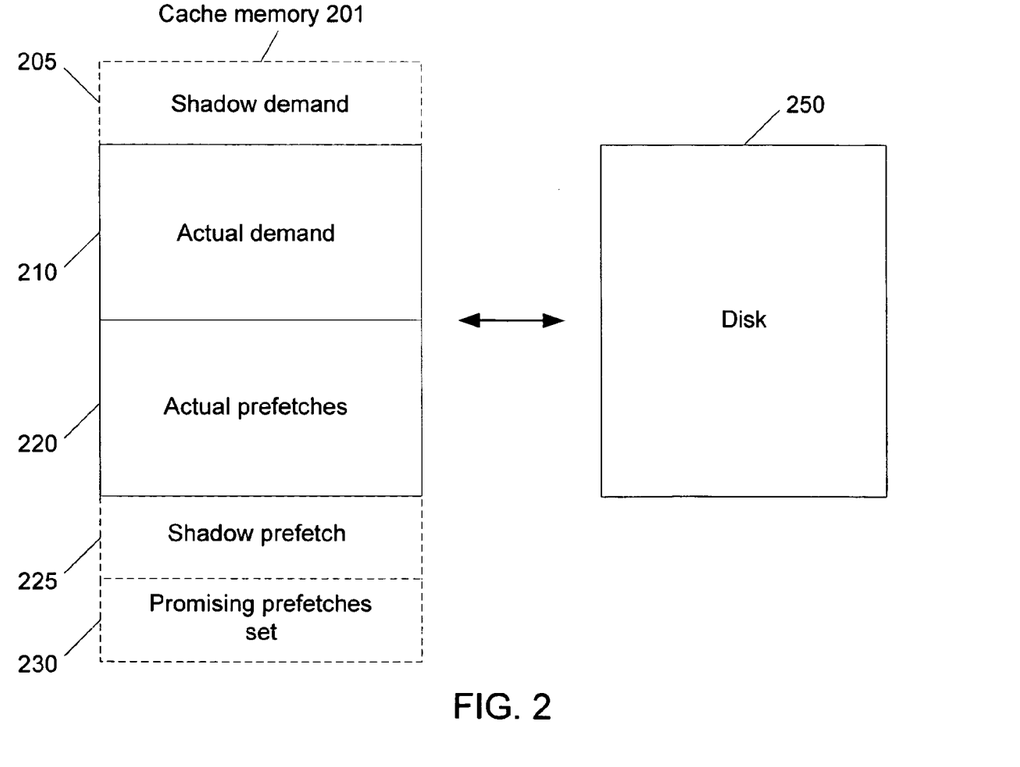
FIG. 2 is a diagram of an example memory system.

FIG. 2 is a diagram of an example memory system. A memory 201 used in such a computer system may be a cache and comprises a shadow demand area 205, an actual demand area 210, an actual prefetches area 220, and a shadow prefetch area 225. Data can be in one of these places of the memory 201, and/or on the disk 250. The actual demand section 210 desirably contains data that has recently been demanded for use by the application, where recently may be defined by the eviction strategy used for the actual demand area. Data will be moved from prefetch 220 to actual demand 210 if the application needs to use it. If some demanded data is in the shadow area 205, the data will be retrieved from the disk 250 and stored in actual demand 210. When there is a request for data in the shadow demand area 205, it is noted that the actual demand area 210 should be larger, and the prefetch area 220 should be smaller. This indicates that the request would have been satisfied by the cache if the actual demand area is big enough to accommodate the entries in the shadow demand area. Similarly, if the data is in the shadow prefetch area 225, an indication is made that it would be desirable to have a larger prefetch area 220 and smaller actual demand area 210. So the sizes are adjusted at the next opportunity.

If it is desired to decrease the size of the actual demand area 210, some data is discarded (e.g., based on the least recently accessed or used). A similar process may occur for decreasing the size of the actual prefetch area 220. Whenever there is available bandwidth between the disk 250 and the memory 201, prefetching may be performed if desired or needed.

An example system may be referred to as a prefetch balancer, because it balances the benefits of prefetching pages that might soon be accessed with the benefits of caching pages that were recently accessed. Recently accessed data items are kept in the cache on the premise that they are likely accessed in the near future. The cache with k entries for the demand area will have the k most recently accessed entries. Pages governed by a prefetch balancer are desirably partitioned into two sets: recently-accessed and not-recently-accessed (described further herein). Associated with each recently-accessed page is a quantity termed "cacheability". The cacheability of a page p indicates the extent to which retaining page p in the cache is beneficial. If page p has a high cacheability value, it is likely to be re-accessed soon and it desirably should be kept in the cache 201 rather than evicting it.

Associated with each not-recently-accessed page is a quantity termed "promise". Promise is a numerical indication that a given piece of data will be accessed in the near future. The promise of a page p indicates the extent to which prefetching page p is beneficial. If page p has a high promise value, it is likely to be accessed soon and it desirably should be prefetched now to save time.

It is desired that recently-/not-recently-accessed pages may be ranked according to cacheability and promise, respectively. A cacheability metric may rank recently accessed pages according to a standard cache eviction policy, such as least recently used. Regarding promise, the promise of a page p may be estimated based on the extent to which pages similar to page p have been accessed recently and frequently. Two pages may be said to be related if an access to one can affect the promise of the other. It is contemplated that cacheability and promise may be estimated, computed, or otherwise determined based on any of a number of techniques and methods.

An example prefetch balancer may comprise the following data structures:

1. actual demands set: this is a set of pages that are cached, because of the workload demanded to access them. The current size of the actual demands set is actual demands size, which can vary over time. In addition, there may also be a time-varying target size actual demands target, which the prefetch balancer desirably achieves if it can. An example storage area is shown as element 210 in FIG. 2.

2. actual prefetches set: this is a set of pages that are cached, because there is reason to believe the workload will soon demand them. The current size of the actual prefetches set is actual prefetches size, which can vary over time. In addition, there is also a time varying target size actual prefetches target, which the prefetch balancer desirably achieves if it can. An example storage area is shown as element 220 in FIG. 2.

3. shadow demands set: this is a set of pages that would have been in the actual demands set if it were larger. The set desirably has a fixed maximum size, shadow demands size. An example storage area is shown as element 205 in FIG. 2.

4. shadow prefetches set: this is a set of pages that would have been in the actual prefetches set if it were larger. The set desirably has a fixed maximum size, shadow prefetches size. An example storage area is shown as element 225 in FIG. 2.

5. promising prefetches set: this is a set of pages known to have non-negligible promise, but which are not promising enough to be in the actual prefetches set or shadow prefetches set. This set desirably has a fixed maximum size, promising prefetches size. This set desirably resides on the disk, shown as element 230 in FIG. 2, for example. The dotted lines indicate that page identifiers are desirably being stored instead of page data.

Using this terminology, a more formal definition of recently- and not-recently-accessed pages may be given. A page may be considered to be recently-accessed if it is in the actual demands set or the shadow demands set, otherwise it is not-recently-accessed. Note that only two of the structures described above desirably cache page data: actual demands set and actual prefetches set. The remaining structures store only page identifiers. Because the size of a page's identifier (e.g., 64 bits) is expected to be at least three or four orders of magnitude smaller than the size of a page's data (e.g., 4 KB-1 MB), these latter structures may be much larger than the former two, in terms of the number of pages they reference.

At system startup, the prefetch balancer is "cold": the data structures are empty. When the system is in steady state, the prefetch balancer is "warm", with its data structures full. A warm prefetch balancer desirably maintains invariants such as:

1. The total number of cached pages is a constant, e.g., cache size. Therefore, actual demands size+actual prefetches size=cache size. (Equation 1)

2. The total target number of cached pages is also equal to the constant cache size. Therefore, actual demands target+actual prefetches target=cache size. (Equation 2)

3. Pages in the actual demands set are more cacheable than pages in the shadow demands set.

4. Pages in the actual prefetches set are more promising than pages in the shadow prefetches set.

5. Pages in the shadow prefetches set are more promising than pages in the promising prefetches set.

Figure 3:
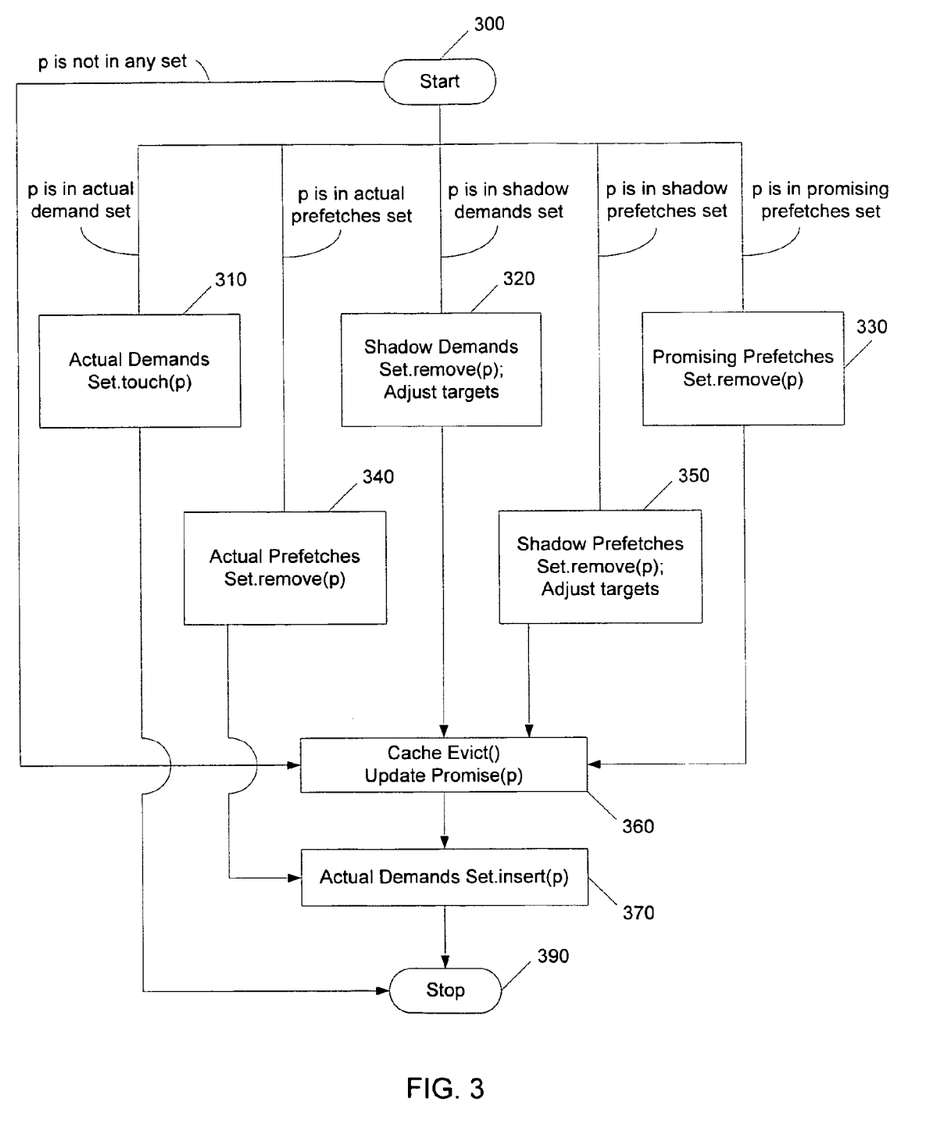
FIG. 3 is a flow diagram of an example demand method.
Figure 4:
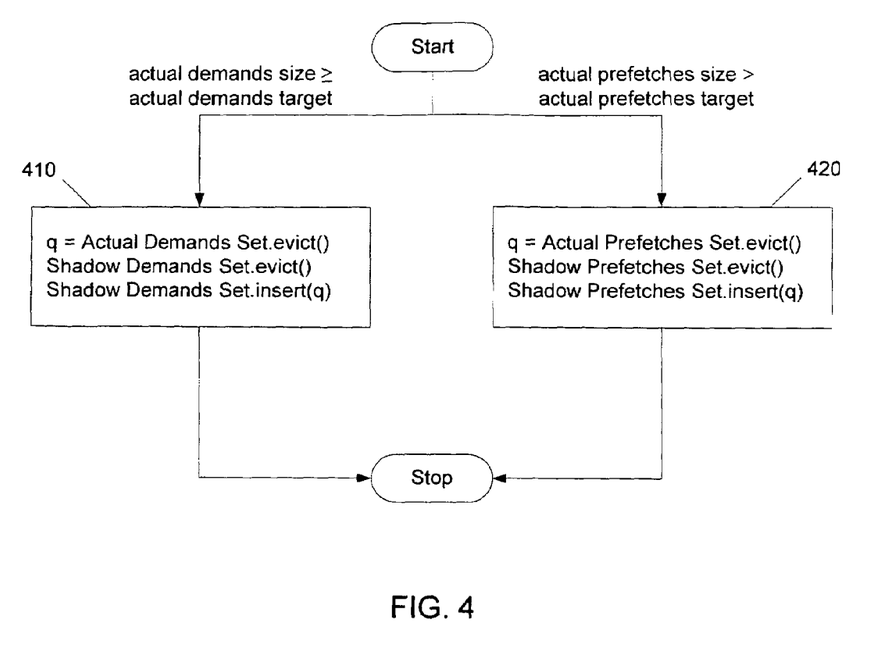
FIG. 4 is a flow diagram of an example cache evict method.
Figure 5:
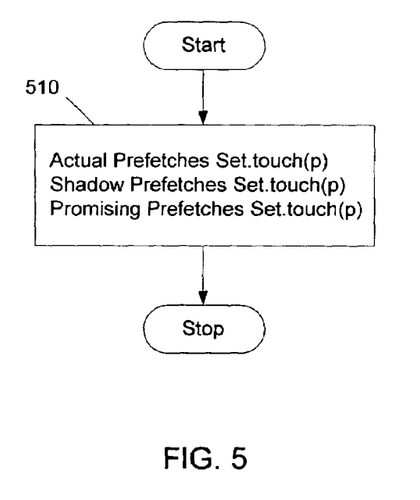
FIG. 5 is a flow diagram of an example update promise method.

A process demand(p) is desirably executed whenever a page p is demanded by the workload. FIG. 3 is a flow diagram of an example demand method, with certain subroutines expanded in FIGS. 4 and 5. More particularly, FIG. 4 is a flow diagram of an example cache evict method and FIG. 5 is a flow diagram of an example update promise method. At the start 300, it is determined which table, if any, the page p is currently present in.

If page p is in the actual demands set, p's cacheability is updated at step 310 and the process stops at step 390. If page p is in the actual prefetches set, p is transferred to the actual demands set by removing p from the actual prefetches set at step 340 and inserting p in the actual demand set at step 370. The process then stops at step 390.

If page p is in the shadow demands set, p is transferred to the actual demands set by removing p from the shadow demands set at step 320 and inserting p in the actual demands set at step 370. Moreover, at step 360, the cache is evicted and the promise is updated. Additionally, the actual demands target is incremented, and the actual prefetches target is decremented. A hit in the shadow demands set is evidence that recently-accessed pages should be retained more, and prefetching not-recently-accessed pages less. The shadow demands set desirably has this property, because it comprises pages that would have been retained in the cache if the actual demands set were larger.

If page p is in the shadow prefetches set, p is transferred to the actual demands set by removing p from the shadow prefetches set at step 350 and inserting p in the actual demands set at step 370. Moreover, the actual demands target is decremented, and the actual prefetches target is incremented. The intuition for this is the same as the previous case, with the roles of recently-accessed and not-recently-accessed pages reversed.

If page p is in the promising prefetches set, then p is inserted into the actual demands set by removing p from the promising prefetches set at step 330 and inserting p in the actual demands set at step 370.

If page p is not in any of the above tables or sets, it is desirably inserted into actual demands set at step 370.

When page p is in the shadow demands set, the shadow prefetches set, the promising prefetches set, or not in any set, a cache eviction is desirably performed at step 360 before p is inserted into the actual demands set. An example cache evict technique is described with respect to FIG. 4. Cache evictions are desirably performed from whichever of the actual demands set and the actual prefetches set is larger than its target size, with ties broken arbitrarily.

If actual demands size is ≧ actual demands target, then q is set equal to actual demands set.evict( ), and shadow demands set.evict( ) is performed, followed by shadow demands set.insert(q), at step 410. If actual prefetches size is > actual prefetches target, then q is set equal to actual prefetches set.evict( ), and shadow prefetches set.evict( ) is performed, followed by shadow prefetches set.insert(q), at step 420. Note that the actual demands set and the actual prefetches set cannot both be smaller than their target sizes, as that would violate either Equation 1 or Equation 2, provided above.

The technique described with respect to FIG. 4 may be referred to as balanced eviction, because it has a natural tendency to move towards the desired balance between prefetched pages and cached pages. The ID of the evicted page is then inserted into the corresponding shadow set; however before this can happen, the shadow set desirably performs its own eviction to make room for the new page ID. Desirably, if page p is not-recently-accessed, then all pages related to it have their promise metric updated as a result of this access (see FIG. 5). FIG. 5 updates the promise of the pages related to p. At step 510, actual prefetches set.touch(p) is performed, followed by shadow prefetches set.touch(p) and promising prefetches set.touch(p). Such pages may then be repositioned in the appropriate tables to maintain invariants (4) and (5), described above. The precise effect of touching page p depends on the definition of promise adopted, and on the definition of pages related to p. However, it should be noted that touching p affects the promise of all pages related to p; this is how the structure of the data is exploited. A particular choice of promise, and a method of updating it, is described below.

Figure 6:
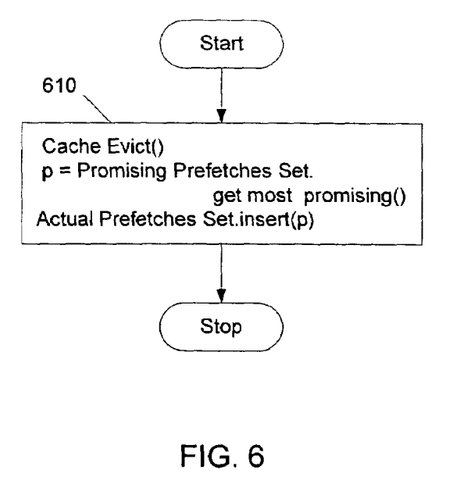
FIG. 6 is a flow diagram of an example prefetch method.

FIG. 6 is a flow diagram of an example prefetch method. To perform a prefetch, assume that the system will receive an external signal or event whenever I/O bandwidth is available. On receiving such an "I/O available" notification, the prefetch balancer initiates a prefetch. This process, depicted in step 610, comprises performing a "balanced eviction" from either the actual demands set or the actual prefetches set, as described above. Then, the most promising page p in the promising prefetches set is prefetched and inserted in the actual prefetches set.

For example, suppose the balanced eviction selects to evict a member q of the actual prefetches set. Before actually evicting q and prefetching p, it is determined whether the promise of p is greater than that of q. If so, the eviction and prefetch are performed. Otherwise, it is determined whether p is promising enough to deserve insertion in the shadow prefetches set. If so, the least promising element of the shadow prefetches set is evicted and replaced by p. On the other hand, if the proposed victim q is a member of the actual demands set, then the prefetch desirably is performed regardless of p's promise.

The data structures desirably support methods such as void touch( ), void insert( ), and pageID evict( ). Regarding void touch(pageID), for recently-accessed pages, update the cacheability of the given page identifier, and for not-recently-accessed pages, update the promise of all pages related to the given page identifier. Regarding void insert(pageID), insert the given page identifier (and the page data, if appropriate) into the data structure. Regarding pageID evict( ), evict the least cacheable or promising page from the data structure, and return its identifier. In addition, some of the data structures have remove(pageID) methods, which have the effect of removing the given page identifier.

It is desired to accomplish better prefetching by exploiting the system's knowledge of the structure of the data in the storage system. Preferably, the assumptions regarding the data's structure are as general as possible.

Thus, to determine what to prefetch from the disk that does not depend on application-specific tasks, the application data is divided into bundles of data. The bundles of data are used to determine promise. If a piece of data in a bundle is accessed, then the promise of all the other data in the bundle is increased. Data in a bundle does not have different promise than other data in that same bundle. So when free I/O bandwidth is available, prefetch data in the bundle with the highest promise is performed. The data is prefetched sequentially, skipping what has already been sent to the memory cache.

More particularly, as an initial general assumption, suppose the system is subjected to a workload W that is a stochastic process. That is, W requests random pages from the system at random times, according to a probability law. Do not assume that W is stationary—in other words, the probability of W accessing a given page p changes over time. The workload defines some of function $AccessProb_w(p, t, \Delta t)$, expressing the probability that page p will be accessed in the interval $[t, t+\Delta t]$. This can be formalized further, by letting $t \to 0$ and defining $AccessRate_w(p, t) = \lim_{\Delta t \to 0} AccessProb_w(p, t, \Delta t)/\Delta t$. $AccessRate_w(p, t)$ is the access rate of page p at time t under workload W.

Access rate allows for fulfillment of the quest for a general, yet exploitable, form of structure imposed on the data. This is done by making the following assumption, referred to as the bundle assumption. The pages in the storage system can be partitioned into equivalence classes (called bundles) such that all pages in a given bundle have similar access rates. Formally, for a bundle B, for all t, and for all p, p'∈ B, $AccessRate_w(p, t) \approx AccessRate_w(p', t)$. Note that once again, stationarity is not assumed. The access rate of pages in a bundle can vary over time, but rates for pages in the same bundle desirably vary together.

For example, for bundles as files in a file system, suppose the storage system is a file system, and that the pages employed by the prefetch balancer correspond to blocks in the files. Then each file may be defined to be a bundle. For some workloads at least, the bundle assumption would hold: over time, the rate at which a file is accessed changes, but it might be desirable to assume that blocks within a file are accessed with approximately the same frequency at any given time.

As another example, for bundles as B-tree levels in a database, suppose the storage system is a database whose low-level data structures are B-trees, and that prefetch balancer pages correspond to B-tree nodes. Then define each level of each B-tree to be a bundle. Putting all nodes of a B-tree into one bundle would violate the bundle assumption, because nodes near the root are accessed much more frequently than nodes near the leaves. But for some workloads, at least, it is reasonable to assume that nodes from the same level of the same B-tree have the same access rates. There is no unique way of defining bundles for a given system—different choices of bundles will lead to different benefits from prefetching. For instance, suppose that in the example above, the file system contains mostly small files of one or two blocks, but possesses a complex directory structure. Then a more desirable choice would be to define a bundle as all blocks in a given directory, rather than a file. The fundamental precept is that bundles should be large enough that prefetching a whole, frequently-accessed bundle produces a significant performance gain, but not so large that the bundle assumption is violated.

To estimate a page's promise, invoke the bundle assumption to derive an expression for the promise of a page. Because estimates are formed based on real data, the results will not be computed with respect to the stochastic process W'. Instead, imagine that an actual workload W has been drawn from, or generated by, W'. The computations will be based on this realized workload W, which comprises a sequence of time-stamped page accesses $W=\{(p_1, t_1), (p_2, t_2), \ldots\}$. This translates into a sequence of bundle access times $W_B=\{(B_1, t_1), (B_2, t_2), \ldots\}$, where each $B_i$ is the bundle containing page $p_i$.

At a given time t, the kth most recent access time of a bundle is defined as: $AccessTime_w(B, k, t) = \max \{t' \text{ such that there exist k distinct values of } t'' \in [t',t] \text{ with } (B, t'') \in W_B\}$ (Equation 3). Once the kth-most-recent access time of a bundle is known, its current access rate can be estimated by dividing the number of accesses by the time taken for those accesses, obtaining $BundleAccessRate_w(B, t) = k/(t-AccessTime_w(B, k, t))$ (Equation 4).

This estimate is also mathematically rigorous. If bundle access is a Poisson process, then Equation 4 is the maximum likelihood estimate (MLE) for the process's Poisson rate, given its kth waiting time. Another reasonable choice would be to use the unbiased estimator $(k+1)/(t-AccessTime_w(B, k, t))$ instead of the MLE. Because the prefetch balancer techniques may depend only on the relative values of these estimates, and a fixed value of k may be used, it makes no substantial difference as to whether the MLE or the unbiased estimator is chosen.

Desirably, small values of k are used (e.g., k=3). A small value of k results in small memory usage. Moreover, if the access rate changes, the estimate will quickly track the change. This is desirable for good performance on workloads with rapidly changing access rates. Additionally, a bundle B cannot be eligible for prefetching until k distinct pages in B have been recently accessed. Thus, only N(B)−k pages remain to be prefetched. Using a large k therefore decreases the opportunity for prefetching, and this decrease can be dramatic for small bundles (as a proportion of the bundle size).

It is desirable to estimate the promise of a page p, at time t, with respect to a workload W—denoted $Promise_w(p, t)$. Because the access rate of p's bundle reflects the likelihood that p will be accessed in the immediate future, it is a good choice as a proxy for the abstract concept of "promise". But the access rate of a page is not the same as the access rate of its bundle: the page access rate is the bundle access rate divided by the number of pages in the bundle. Thus, writing p's bundle as B(p), and the number of pages in the bundle by $|B(p)|$, define $Promise_w(p, t) = BundleAccessRate_w(B(p), t)/|B(p)|$.

Thus, the prefetch balancer may exploit the structure of the data to improve prefetching performance. Desirably, the prefetch balancer can exploit any data structure for which the bundle assumption holds. The prefetch balancer may trade off the number of demanded pages against the number of prefetched pages. An example prefetch balancer has several aspects, including computing the promise of a page, based on the bundle assumption, and a promising prefetches set.

Figure 7:
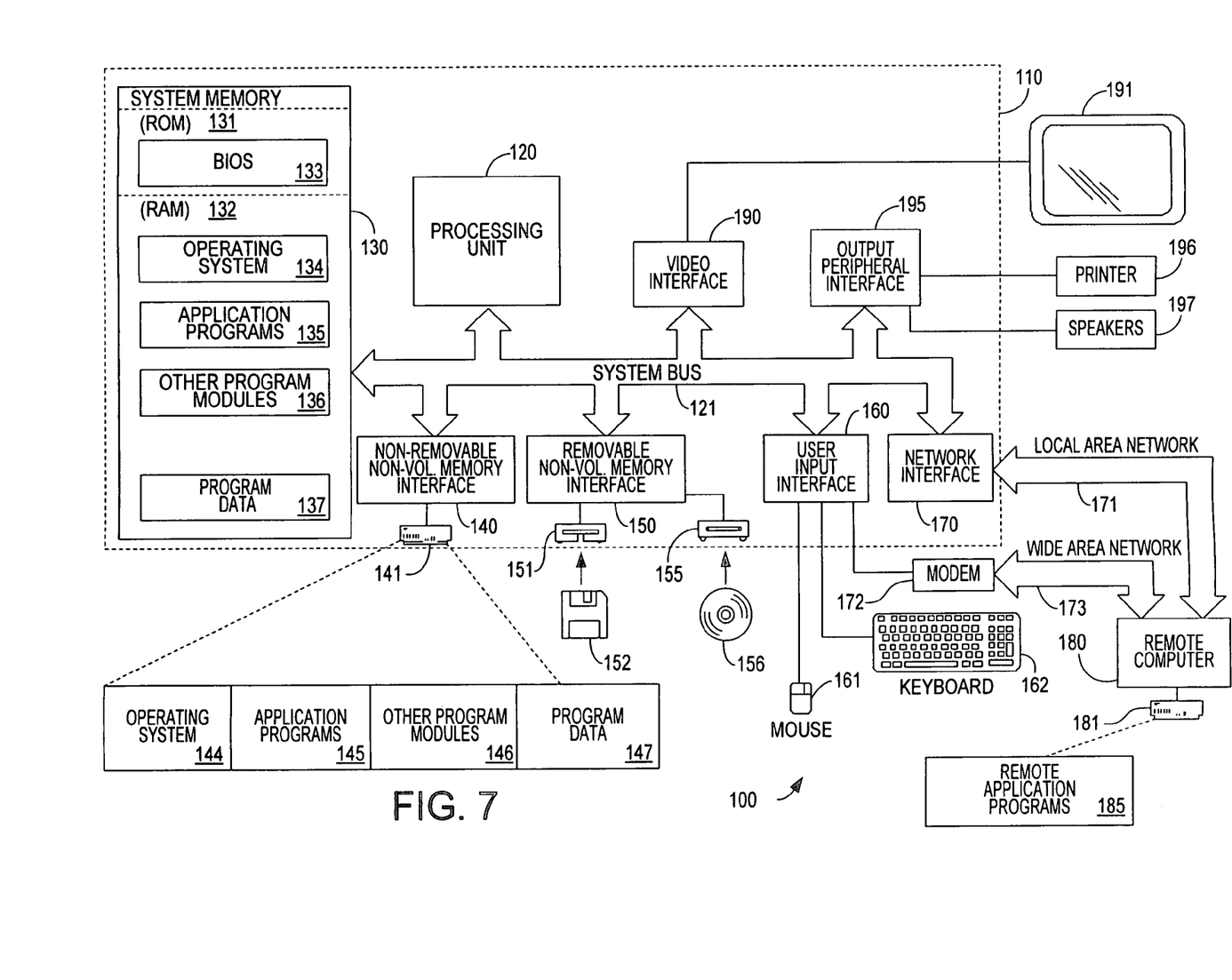
FIG. 7 is a simplified schematic illustrating an exemplary architecture of a computing device in which aspects of the invention may be implemented.

FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 7, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136 and program data 137.

The computer 110 may also include other removable/non-removable, volatile/nonvolatile computer storage media. By way of example only, FIG. 7 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet or electronic digitizer, a microphone, a keyboard 162 and pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention may be described in terms of software modules or components, those skilled in the art will recognize that such may be equivalently replaced by hardware components. Therefore, the invention as described herein contemplates all such embodiments as may come within the scope of the following claims and equivalents thereof.

What is claimed:

1. A system balancing prefetched and cached data arranged in a plurality of pages, the balancing system comprising:
    a first data storage area, and a second data storage area, wherein the second data storage area operates slower than the first data storage area and wherein the first data storage area is divided into at least four data storage sections, the four data storage sections including:
    an actual demand area caching at least one page demanded by an application, which is dynamically adjustable in size the actual demand area associated with an actual demand area target size parameter, responsive to a request from said shadow demand area;
    a shadow demand area storing at least one identifier of a respective page that would have been cached in the demand area if the size of the actual demand area were larger;
    an actual prefetch area associated with an actual prefetch target area size;
    a shadow prefetch area storing at least one identifier of a respective page that would have been cached in the actual prefetch area if the size of the actual prefetch area were larger;

a processor, wherein the processor:
   associates each page with a cacheability parameter or a promise parameter;
   partitions each of the plurality of pages into at least one equivalence class, each equivalence class characterized by having a same access rate for each page in the class;
   receives a request for a demanded page;
   transfers the demanded page to the actual demand area;
   when the demanded page is in the shadow demand page area, increments the actual demand area target size parameter and decrements the actual prefetch target area size;
   when the demanded page is in the shadow prefetch area, decrements the actual demand area target size parameter and increments the actual prefetch target area size;
   when the demanded page is in the second data storage area:
     transfers the demanded page to the actual demand area;
     determines at least one related page to the demanded page;
     updates a respective promise parameter of each of the at least one related page,
   wherein each of the at least one related page is in an equivalence class of the demanded page and the promise parameter for all pages in the equivalence class is updated using a determined access rate for the demanded page.

2. The system of claim 1, wherein the first data storage area is a cache memory and the second storage area is a disk memory.

3. The system of claim 1, wherein the processor updates:
   an actual demands set storing at least one first cached page based on workload demand, wherein the actual demands set is associated with a demands size and a time-varying demands target size;
   an actual prefetches set storing at least one second cached page based on a projected workload demand, wherein the prefetches set is associated with a prefetches set size and a time varying prefetches target size;
   a shadow demands set storing at least one identifier of a respective page that would have been in the actual demands set if it were larger, wherein the shadow demands set is associated with a shadow demands set size;
   a shadow prefetches set storing at least one identifier of a respective page that would have been in the prefetches set if it were larger, wherein the prefetches demands set is associated with a prefetches demands set size;
   a promising prefetches set storing at least one identifier of a respective page, wherein each page has a promise parameter exceeding a predefined threshold, wherein the promising prefetches set resides in the second data area.

4. The system of claim 3, wherein the processor further:
upon receiving an event notification signaling I/O bandwidth is available:
   determines a most promising page;
   performs a balanced eviction from one of the prefetches area and the actual demand area;
   prefetches the most promising page; and
   inserts the most promising page in the actual prefetches area.

5. The system of claim 3, wherein the processor further:
associates each page with an access status of one of recently-accessed and non-recently-accessed, wherein a page is designated as recently-accessed page if it is cached in the actual demands area or identified in the shadow demands area and otherwise designated non-recently-accessed; and
associates each recently-accessed page with a cacheability parameter indicating a degree of likelihood the recent-accessed-page will be re-accessed soon and each non-recently-accessed page with a promise parameter indicating a degree of likelihood that the non-recently-accessed page will be accessed soon and the promise quantifier determined based on an extent to which pages related to the non-recently-accessed page have been accessed recently.

6. The system of claim 1, wherein the processor further:
when the demanded page is in the actual demands area, updates a cacheability parameter of the demanded page;
when the demanded page is in the actual prefetches area, transfers the demanded page to the actual demand area;
when the demanded page is in the shadow demand area:
   transfers the demanded page to the actual demand area;
   updates a promise parameter of the demanded page;
   increments the actual demand area target size parameter;
when the demanded page is in the shadow prefetches area:
   transfers the demanded page to the actual demand area;
   decrements the actual demand area target size parameter.

7. The system of claim 1, wherein the equivalence classes are files in a file system.

8. The system of claim 7, wherein the equivalence classes are B-tree levels in a database.

9. A prefetching method comprising:
receiving a request for data;
determining if the requested data is in an actual demand area, an actual prefetch area, a shadow demand area or a shadow prefetch area all of which are comprised within a storage area comprising a promise prefetch data structure, wherein the actual demand area is dynamically adjustable in size and comprises data that is currently being used, and the actual prefetch area is dynamically adjustable in size and comprises data that may be accessed soon, the promising prefetch data structure having a fixed maximum size and comprising data which has a probability of demand lower than a probability of demand for data in said shadow prefetch area;
checking for identifiers associated with the requested data in at least one of a shadow demand area and a shadow prefetch area;
providing the requested data from the actual prefetch area to the actual demand area if the requested data is in the actual prefetch area; and
providing the requested data from the actual demand area if the requested data is in the actual demand area
when the requested data is not in the actual demand area, actual prefetch area, shadow demand area or shadow prefetch area:
   transfer the requested data to the actual demand area;
   determine at least one related data to the requested data;
   update a respective promise parameter of each of the at least one related data, wherein each of the at least one related data is a respective equivalence class of the requested data, wherein each equivalence class is characterized by having a same access rate for all pages in the class, and the promise parameter for all data in the equivalence class is updated using a determined access rate for the demanded page.

10. The method of claim 9, further comprising receiving the requested data at the actual demand area from a second data storage area if the request seeks data identified in the shadow demand area or the shadow prefetch area.

11. The method of claim 9, further comprising adjusting the sizes of the actual demand area and the actual prefetch area based on the requested data identified in the shadow demand area or the shadow prefetch area.

12. The method of claim 11, wherein adjusting the sizes of the actual demand area and the actual prefetch area comprises increasing the size of the actual demand area and decreasing the size of the actual prefetch area responsive to a request for data identified in the shadow demand area, and decreasing the size of the actual demand area and increasing the size of the actual prefetch area responsive to a request for data identified in the shadow prefetch area.

13. The method of claim 12, wherein decreasing the size of the actual prefetch area or the actual demand area comprises discarding data from the actual prefetch area or the actual demand area.

14. The method of claim 13, wherein the data being discarded is based on data that is least recently accessed or used.

15. A computer-readable storage medium having stored thereon instructions that:
receives a request for data and determines if the requested data is in an actual demand area, an actual prefetch area, a shadow demand area or a shadow prefetch area all of which are comprised within a storage area comprising a promise prefetch data structure,
wherein the actual demand area is dynamically adjustable in size, comprising data that has recently been used,
wherein the shadow demand area comprises identifiers associated with data stored on a remote storage device,
wherein the actual prefetch area is dynamically adjustable in size, or
wherein the shadow prefetch area comprises additional identifiers associated with data stored on the remote storage device,
wherein the promising prefetch data structure has a fixed maximum size and includes promising identifiers;
upon receiving a request for data, when the requested data is not in the actual demand area, actual prefetch area, shadow demand area or shadow prefetch area:
transfers the requested data to the actual demand area;
determines at least one related data to the requested data;
updates a respective promise parameter of each of the at least one related data, wherein each of the at least one related data is in an equivalence class of the requested data, wherein each equivalence class is characterized by having a same access rate for all pages in the class and the promise parameter for all data in the equivalence class is updated using a determined access rate for the demanded page.

16. The computer-readable storage medium of claim 15, wherein the actual demand area receives data from the remote storage device if a request seeks data identified in the shadow demand area or the shadow prefetch area.

17. The computer-readable storage medium of claim 15, wherein the sizes of the actual demand area and the actual prefetch area are adjustable based on a request for data identified in the shadow demand area or the shadow prefetch area.

18. The computer-readable storage medium of claim 15, wherein the data comprises pages, wherein each page has an associated cacheability quantity or an associated promise quantity and wherein the cacheability quantity is associated with recently-accessed pages, and the promise quantity is associated with non-recently-accessed pages.

19. A prefetch balancing system, the system comprising:
a cache memory and a disk memory, wherein the disk memory operates slower than the cache memory and wherein the cache memory is divided into at least four sections, the four sections including,
a shadow prefetch section containing data,
an actual prefetch section, which is dynamically adjustable in size, comprising data,
a shadow demand section, and
an actual demand section which is dynamically adjustable in size, receives data from the actual prefetch section, wherein the actual demand section comprises data that is in use and receives data from the disk memory if a request seeks data identified in the shadow demand section,
the cache memory comprising a promising prefetch data structure having a fixed maximum size,
a processor, wherein the processor upon receiving a request for data, when the requested data is not in the actual demand section, shadow refetch section actual prefetch section or shadow prefetch section:
transfers the requested data to the actual demand section;
determines at least one related data to the requested data;
updates a respective promise parameter of each of the at least one related data is in an equivalence class of the requested data, wherein each equivalence class is characterized by having a same access rate for all pages in the class, and the promise parameter for all data in the equivalence class is updated using a determined access rate for the demanded page.

20. The system of claim 19, wherein the equivalence classes are files in a file system.

* * * * *